(12) United States Patent
Wipasuramonton et al.

(10) Patent No.: US 6,256,601 B1
(45) Date of Patent: Jul. 3, 2001

(54) ROLLOVER TEST SLED

(75) Inventors: Pongdet P. Wipasuramonton, Rochester; Palaniappan Palaniappan, Jr., Detroit; Frederick S. Anderson, Fraser, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/123,074

(22) Filed: Jul. 27, 1998

(51) Int. Cl.[7] .................................... G01L 25/00
(52) U.S. Cl. .................. 703/8; 703/7; 73/1.39; 73/12.01; 73/12.07; 73/865.3
(58) Field of Search .................. 703/7, 8, 3, 28; 73/1.39, 12, 12.01–12.08, 82, 865.3, 866.5

(56) References Cited

U.S. PATENT DOCUMENTS

| 5,355,716 | * | 10/1994 | Castelli | 73/1 D |
| 5,483,845 | * | 1/1996 | Stein et al. | 73/865.3 |
| 5,623,094 | * | 4/1997 | Song et al. | 73/12.07 |
| 5,929,348 | * | 7/1999 | Stein et al. | 73/865.3 |
| 6,023,984 | * | 2/2000 | Mazur et al. | 73/865.3 |

* cited by examiner

Primary Examiner—Kevin J. Teska
Assistant Examiner—Thai Phan
(74) Attorney, Agent, or Firm—Markell Seitzman

(57) ABSTRACT

An apparatus (20) to simulate the behavior of vehicle occupant and safety systems in a rollover accident, comprising: a frame (30) adapted to receive a portion of a vehicle to be tested or test buck (40), the frame being articulated, about a pivot (36), to enable it to rotate a predetermined amount; forcing device (24;72) for causing the frame, and test buck, to rotate.

16 Claims, 4 Drawing Sheets

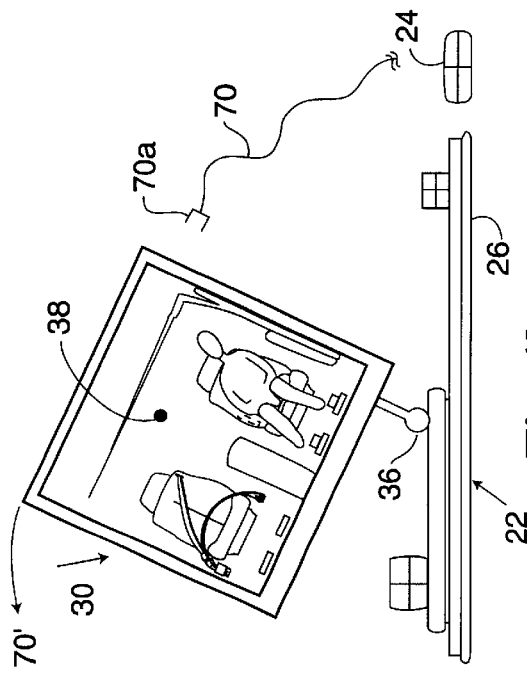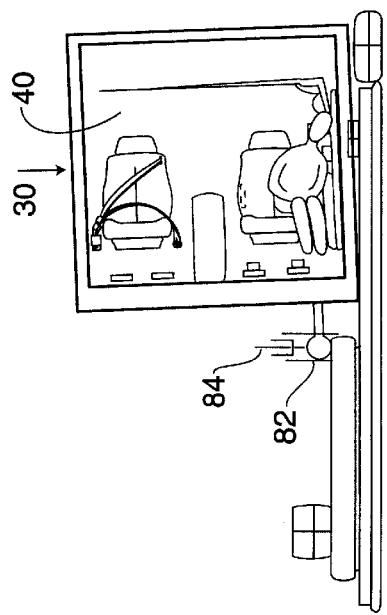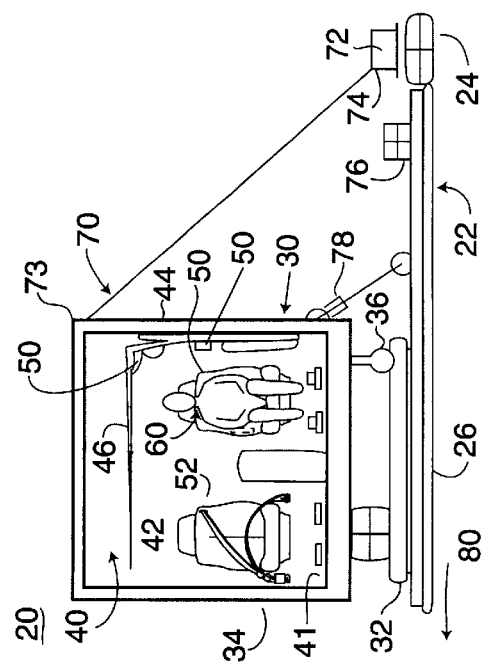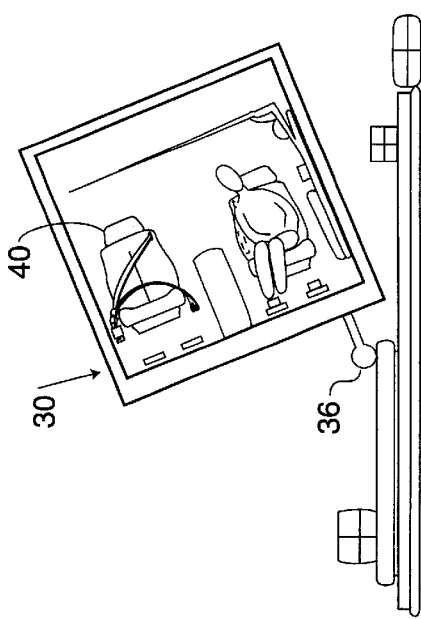
Fig. 1a
Fig. 1b
Fig. 1c
Fig. 1d

ROLLOVER TEST SLED

BACKGROUND AND SUMMARY OF THE INVENTION

The invention generally relates to an apparatus used to simulate the behavior of a vehicle occupant and the safety restraint system in a rollover accident.

Those individuals and companies involved in the design and development of safety restraint systems have found it beneficial to evaluate the behavior of these systems in a dynamic environment. Various test apparatus exist for testing and simulating frontal and side impact collisions. These apparatus typically include a sled which is either propelled down a guide way via a spring into a barrier thereby simulating the crash. Alternatively, a stationary sled is pushed or poked by a movable piston to simulate the crash. This type of sled is known as a "Hyge" sled. Situated upon or attached to the movable portion of the sled is an actual vehicle, vehicle part or test buck which includes a portion of a vehicle such as the passenger compartment, seats, door, roof and/or instrument panel. The seat and the vehicle are equipped with the various safety restraint systems, which may include a three-point or seat-integrated seat belt system as well as appropriate frontal and side impact air bag systems. An instrumented dummy is secured to the seat (as would be an actual occupant) and the vehicle tested and data gathered.

In addition to simulating the frontal and side impact collisions, it is also desirable to be able to simulate, and thereby evaluate, the performance of an occupant safety restraint system during a rollover accident to effectively develop safety countermeasures.

It is an object of the present invention to provide a rollover test apparatus. Accordingly the invention comprises: an apparatus to simulate the behavior of vehicle occupant and safety system in a rollover accident, comprising: a frame adapted to receive a portion of a vehicle to be tested including test buck, the frame being articulated about a pivot 36 to enable it to rotate a predetermined amount; forcing means 24,72 for causing the frame and vehicle to rotate. As can be appreciated, the vehicle (or part of the vehicle to be tested or test buck) may include one or more seats, a vehicle side portion and a side impact safety system deployed generally from one of the seat, the vehicle side portion or vehicle roof rail as well as an instrumented test dummy. In the preferred embodiment the Hyge sled, has a movable sled, carriage or sled carriage 26 and piston 24. The piston is used to move the frame and cause it to rotate. The system may optionally include a tether means secured to the frame for causing the frame to begin to rotate when the frame is moved in the first direction. This tether can be fixed or can be used to forcibly rotate the frame.

Many other objects and purposes of the invention will be clear from the following detailed description of the drawings.

BRIEF DESCRIPTION OF DRAWINGS

In the drawings:

FIGS. 1a–1d schematically represent a test rollover test apparatus.

DETAILED DESCRIPTION OF THE DRAWINGS

Figure 2:
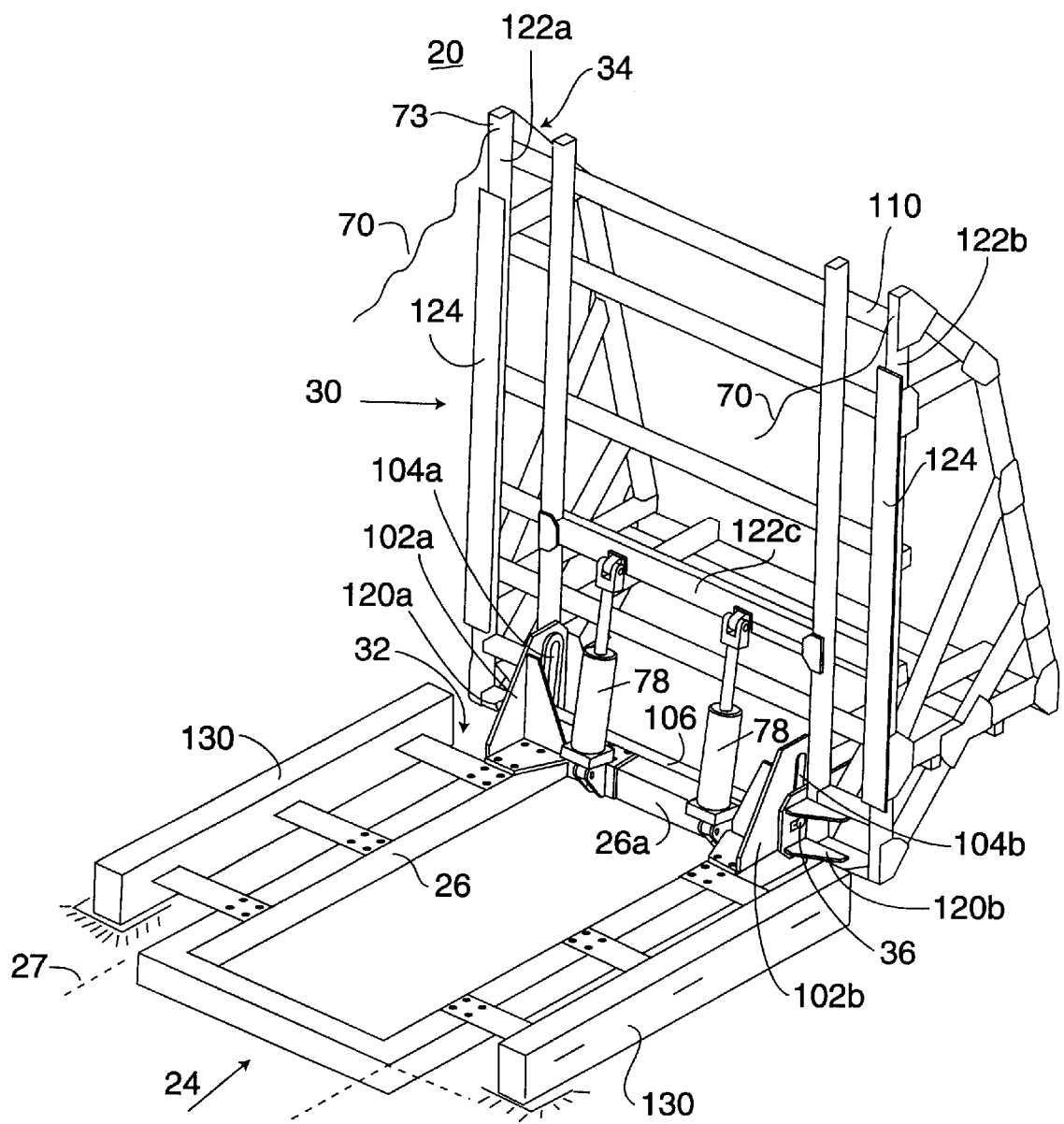
FIG. 2 shows a more detailed view of the major components of the present invention.

Reference is made to FIGS. 1a–1d which schematically show the major features of a rollover test apparatus or system generally shown by numeral 20. In the embodiment illustrated in the accompanying drawings, the apparatus 20 utilizes a Hyge test sled 22 comprising a piston 24 and a movable carriage or sled 26. This type of test apparatus is well known and need not be discussed in any further detail. Secured to the sled or carriage 26 is a frame 30 which includes a support 32 (secured to the sled 26) and a carrier 34. The carrier is hinged relative to the support 32 at a hinge 36. The carrier is sized to permit the mounting thereto of an actual vehicle portion, vehicle, or test buck generally shown and referred to as vehicle 40. As can be appreciated, the location of the pivot or hinge 36 represents a simulated location of the tire/road interface of the actual vehicle and the point about which the typical vehicle would tend to roll over. The distance from the hinge 36 to the vehicle seat location can be varied to correspond to the exact distance found in the vehicle being simulated. One means of varying this distance is to insert wooden or metal platforms or spacers 41 under the vehicle 40. The vehicle 40 may include one or more seats 42 (42a), a side panel 44 and roof 46. The seat and/or side panel of the vehicle may further include an inflatable safety restraint system generally shown as 50. The vehicle 40 may additionally include a seat belt system 52. The belt system 52 can be secured about a dummy 60 to simulate a "belted" dynamic test. The system 20 may further include a tether 70 secured to a portion of the carrier 34 and to a known location generally shown as 72. In the illustrated embodiment the tether 70 is removably secured to the frame such as by a C, L or U shaped collar which slides off of or is broken off from the frame after the sled 26 has been pushed away from the piston and frame 30 has begun to rotate. The known location 72 can be a fixed location such as the floor or a variable location such as, for example, an adjustable length ratchet, a motorized winch or piston-cylinder pneumatic system. The cable 70 may be constructed of steel or reinforced belt. It should also be appreciated that by including of a powered tether 70 permits the implementation of an inexpensive variant of the invention. In this embodiment the Hyge sled is not used. The frame is secured to the test floor and the carrier 34 is merely pulled down by operation of the powered tether. Further, in this embodiment or in those described below, a second tether 70' can be secured to the carrier 34 generally opposite to the location of tether 70. This second tether 70' can be spring loaded or powered. In essence this second tether 70' generates an opposing force which permits the angular, rollover speed of the carrier to be controlled and shaped (varied) during the rollover event. As can be appreciated, the carrier 34 can be rolled at very slow angular rate (when the opposing forces are nearly the same) and rotated at extremely fast and variable angular rates when the forces are unequal.

The structure of the hinge 36 can vary. The hinge 36 can be a socket located at a fixed hinge location, slotted hinge or an open hinge such as diagrammatically shown as 82 in FIG. 1d. The slot 82 (also see 104a,b) can include an energy absorbing device to control any bounce or movement of the carrier 34 in the slot 82. This energy-absorbing device can include a hydraulic shock absorber, a honeycombed piece of metal or a rubber material. In this embodiment, the hinge 36 includes an open ended, upward slot 82 which provides an additional degree of freedom permitting the pivoted side of the frame to bounce upwardly in the direction of the slot 82, thereby lessening the stress at the hinge 36 to more realistically represent the dynamics in a 90° vehicle rollover.

The operation of the invention is as follows. With the dummy 60 in place and the instrumentation in a ready condition, the piston 24 explosively impacts the movable carriage 26 causing the sled and frame 30 to initially move horizontally in a direction generally shown by numeral 80. Due to the hinged connection at 36 and inertia of the loaded carrier 34, the carrier 34 will tend to lag behind the linear motion of the sled 26 (and base or support 32) effectively causing the carrier 34 to pivot as illustrated in FIG. 1*b*. If the forces and speed input to the sled 26 by the piston 24 are sufficient, the pivoting motion of the carrier 34 will be sufficient to place its center of gravity 38 to the right of the hinge 36, thereby causing the frame 30 to further rotate to its final position which is representative of a 90° rollover accident as illustrated in FIG. 1*d*. FIG. 1*c* shows an intermediate position in the rolling over of the vehicle 40, that is the frame 30 (carrier 34 and vehicle 40). The sled 26 may also include an energy-absorbing pad 76 of material to cushion the fall of the frame. It may further include a shock-absorbing device 78 to control the rotational motion of the carrier 34.

The above-mentioned optional tether 70 is used to encourage the frame 30 to begin its rotation after the carriage 26 is moved. With the tether 70 attached to the carrier 34 and to a fixed location, the motion of the frame 30 in the direction of arrow 80 will immediately be resisted by the reaction forces generated in the tether 70, thereby immediately tipping the carrier 34 over and causing the frame 30 to rotate toward its final position.

An added degree of freedom may be introduced into the system by attaching an end such as 74 of the tether to a motorized winch or other force-producing mechanism such as a ratchet or pneumatic cylinder (as mentioned above). The initial operation of this type of system is identical to that described above, however, once the tether 70 is tensioned by the leftward motion of the sled 26, the winch or other force-producing mechanism (also shown by numeral 72) can be activated in a controlled manner, thereby generating an additional force upon a corner such as corner 73 of carrier 34, thereby causing the carrier 34 (i.e. frame 30) to rotate towards its rolled-over condition at an increased and controlled angular velocity and acceleration. The motion of the rotating frame 30 can further be controlled by introducing a shock absorber 78 between the frame 30 and the sled 26.

Figure 3:
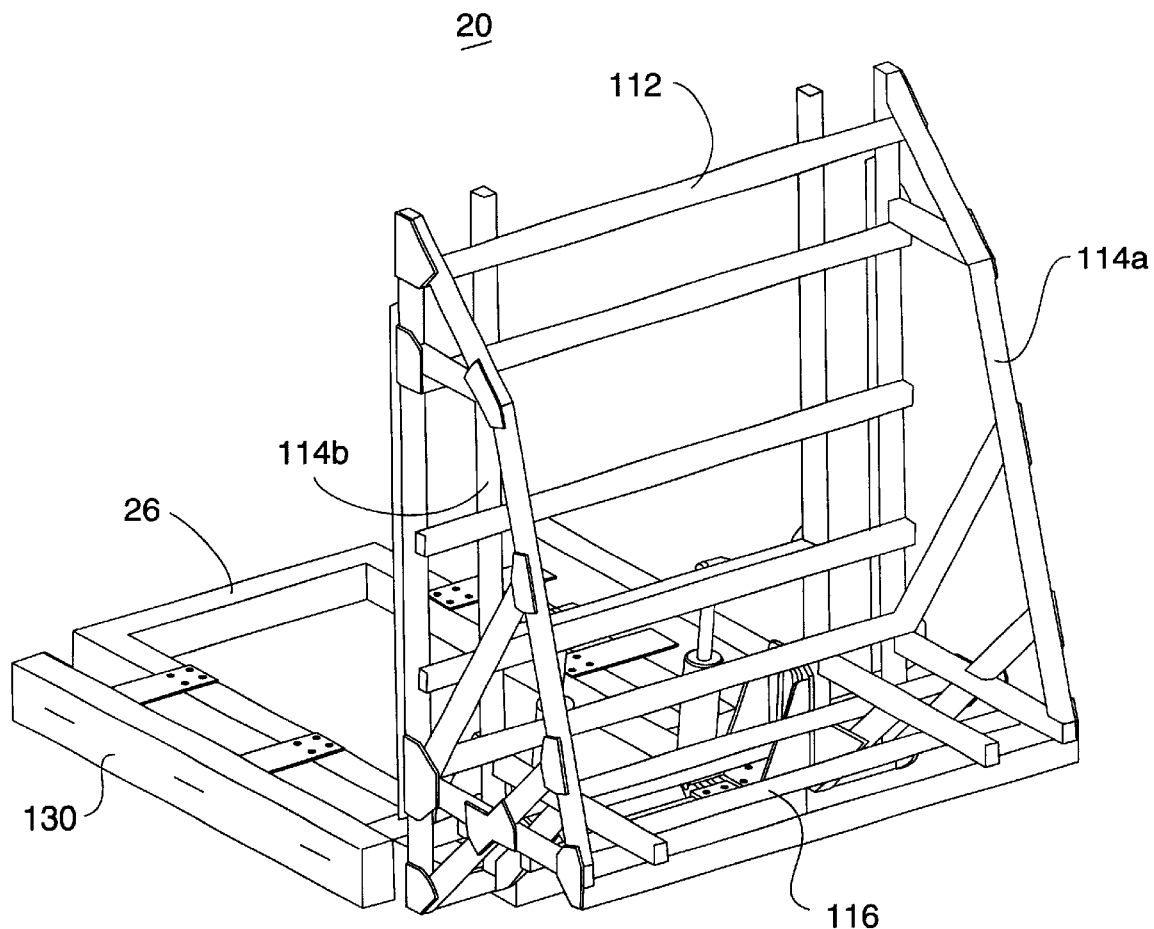
FIGS. 3 and 4 show more detailed isometric views of the present invention.
Figure 5:
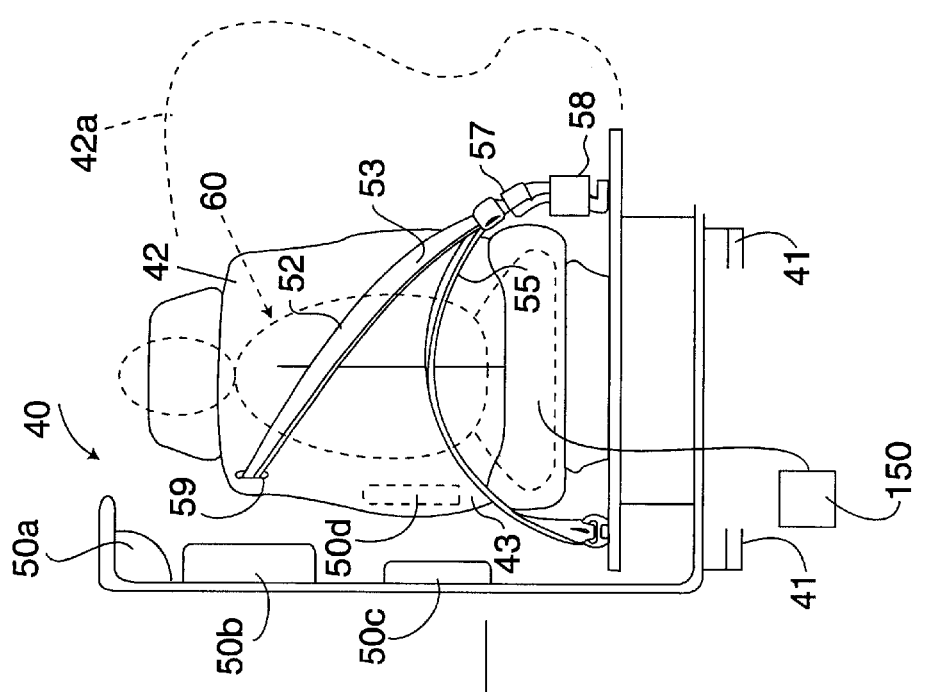
FIG. 5 is a side view of the present invention and also shows a vehicle or vehicle part to be tested.
Figure 4:
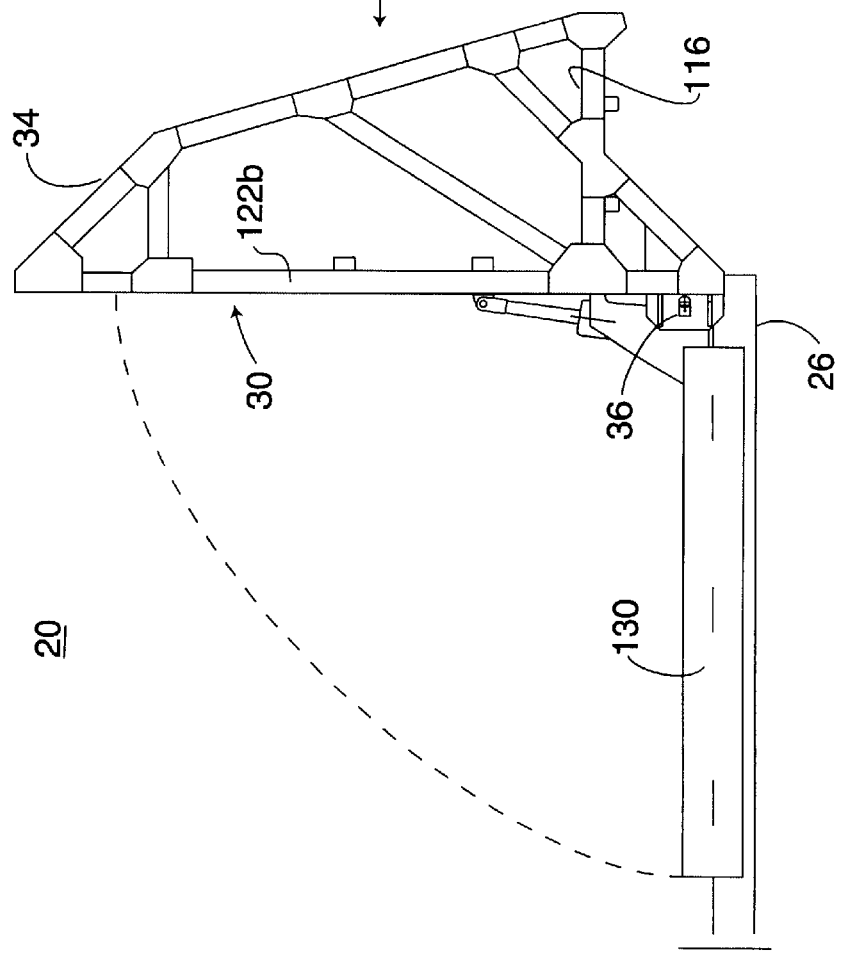

Reference is now made to FIGS. 2-4 which show, in greater detail, a rollover test system 20. The frame 30 comprises two opposing brackets 102*a* and 102*b* secured to the sled 26 which is movable within a guide way 27 (shown in phantom line) normally used with Hyge testing sleds. Brackets 102*a* and *b* also assist in defining the hinge 36. As will be seen, the hinge 36 is formed in part by two vertically directed oval openings 104*a* and 104*b*. The openings 104*a* and *b* are slightly angled toward the carrier 34 which assists in maintaining a pivot pin 106 within the lower portion of these openings 104*a* and *b* when the sled 26 is stroked by the piston 24. The carrier 34 is fabricated of a plurality of metal bars generally shown as 112 secured together by either welding or fasteners. The vehicle portion 40, also shown in FIG. 4, is slid upon the platform 116 and secured thereto by appropriate fasteners. Spacers 41 can be used to vary the height of the vehicle 40 relative to the hinge point 36. As can be seen from FIGS. 2 and 3, the width of the carrier 34 is significant which permits simultaneous testing of a front and rear vehicle occupant in the test apparatus 20. As can be appreciated, the vehicle test part or test buck 40 would include a first seat 42 and a second seat, such as 42*a*, located as it would be found in the particular vehicle being tested or simulated. Seen more particularly in FIGS. 2 and 4, the lower portion of the carrier 34 includes a plurality of brackets 120*a* and 120*b*. Extending between these brackets 120*a* and *b* is the rod or pin 106 which also extends through the slots or openings 104*a* and 104*b*. The tethers 70 are schematically illustrated in FIG. 2 and extend from upright posts 122*a* and 122*b* of the carrier 34. As mentioned above, the other ends of these tethers 70 can be attached to a stationary object proximate the guide way 27 or to a winch (not shown). The shock absorbers 78 are connected between a horizontal post 122*c* of the carrier 34 and a portion 26*a* of the sled 26. The posts 122*a* and 122*b* are covered by a resilient material 124. This material is a shock-absorbing material such as aluminum honeycomb, visco-elastic rubber or foam.

The shock absorbers 78 are preferably of the variable damping variety which may be found in typical automotive use or as a component of a test apparatus. The damping of the shock absorbers may be varied to simulate the damping that would be achieved as the side panels of the vehicle are crushed during an accident and thereby provide an additional feature to tune the performance of the system 20.

Reference is now made to the carriage 26 of sled 22. Positioned on both sides of the sled 26 and movable therewith are a plurality of rectangular blocks 130. These blocks are in contact with and slide upon the test floor adjacent the guide way 27 (the blocks can also be slightly above the floor). These blocks 130, in combination with the shock-absorbing material 124, cushion the impact of the falling carrier 34. In the preferred embodiment of the invention, these blocks 130 are made of wood, however, other materials such as foam or aluminum honeycomb may be substituted.

Reference is briefly made to FIG. 4 which, as mentioned, shows a side view of the carrier 34. Additionally, FIG. 4 illustrates the vehicle, vehicle part or vehicle buck 40 which may include one or more vehicle seats 42 and 42*a* and associated dummies 60, . The dummies are connected to a data-gathering computer 150 so that data on acceleration, deflection and force can be accumulated and analyzed. The vehicle or vehicle part 40, as mentioned above, may include a plurality of safety restraint systems such as a plurality of side impact systems which include a roof rail air bag 50*a*, a B-pillar air bag 50*b*, a side impact air bag 50*c* on or proximate the location of a door, or a side impact air bag shown as 5o*d* located in an outboard wing 43 of one or both seats 42 and 42*a*. The vehicle, as mentioned above, may include a safety belt system generally shown as 52, comprising a shoulder belt 53, lap belt 55, tongue 57 and buckle 58 which are appropriately anchored to the vehicle floor or vehicle seat. While the shoulder belt 53 is shown emanating from an opening 59 in the seat, the seat belt system 52 can be configured wherein the shoulder belt is looped though a D-ring (or web guide) secured to the B-pillar (or C-pillar for seat 42*a*) of the vehicle. While not shown, the safety restraint system may further include a retractor to maintain the shoulder belt taut about the dummy 60.

Many changes and modifications in the above-described embodiment of the invention can, of course, be carried out without departing from the scope thereof. Accordingly, that scope is intended to be limited only by the scope of the appended claims.

What is claimed is:

1. An apparatus (20) to simulate the behavior of a vehicle occupant and safety system in a rollover accident, comprising:

frame means (30) for receiving an article to be tested, including a portion of a vehicle including vehicle part or test buck (40), including first means for permitting the article to rotate from at least a first orientation to a second orientation to simulate the rolling-over of the article about a longitudinal axis thereof;

forcing means (24:72), operatively linked to the frame means, for imparting an acceleration to the frame means to cause the article to be tested to rotate.

2. The apparatus as defined in claim 1 wherein the portion of the vehicle (40) to be tested or the test buck includes a seat (42), a vehicle side portion (44) and a side impact safety system (50) deployed generally from one of the seat, the vehicle side portion or vehicle roof rail.

3. The apparatus as defined in claim 1 including an instrumented test dummy (60).

4. The apparatus as defined in claim 1 wherein the forcing means includes a Hyge sled (26) and piston (24), the piston movable in a first direction and capable of forcing the frame means, upon impact of the piston with the sled, to move relative to the sled to place its center-of-gravity (cg) apart from the pivot (36) enabling the frame means (30) to rotate.

5. The apparatus as defined in claim 4 further including a tether means (70) secured to the frame means (30) for causing the frame means to begin to rotate as the frame means moves in the first direction.

6. The apparatus as defined in claim 5 wherein an opposite end (74) of the tether means is fixedly secured.

7. The apparatus as defined in claim 5 wherein an opposite end of the tether means is movable to pull the frame means down.

8. The apparatus as defined in claim 4 wherein a variable shock absorber system (78) is used to tune or control the rotational motion of the frame means (34).

9. The apparatus as defined in claim 1 including means for varying the distance between the vehicle (40) and the pivot.

10. An apparatus (20) to simulate the behavior of a vehicle in a rollover accident, comprising:

a sled (26) arranged to slide along a first direction in a first plane;

force producing means for applying a force to the sled causing it to move along the first direction;

frame means (30), secured to and movable with the sled, the frame means for receiving an article to be tested including a vehicle part or test buck (40), the frame means initially positioned at a first orientation including being positioned perpendicular to the sled;

a pivot (36) linking an end of the frame means to the sled enabling the frame means to rotate a predetermined number of degrees about a horizontal axis to simulate the rolling-over of the vehicle, the axis also extending through the pivot.

11. The apparatus as defined in claim 10 wherein the predetermined number of degrees is about 90 degrees.

12. The apparatus as defined in claim 10 wherein a top of the frame means, as the frame means rotates about the pivot, moves in a direction generally opposite the first direction.

13. The apparatus as defined in claim 10 further including second force producing means for applying a force directly to the frame means causing same to rotate about the pivot.

14. The apparatus as defined in claim 10 further including dampening means, connecting the sled and the frame means, controlling the speed at which the frame means rotates toward the sled.

15. An apparatus (20) to simulate the behavior of a vehicle in a rollover accident, comprising:

a sled (26) arranged to slide along a first direction in a horizontal plane;

a frame (30), secured to and movable with the sled, the frame adapted to receive an article to be tested including a portion of a vehicle, vehicle part or test buck (40), the frame initially positioned at a determinable first angular orientation relative to the sled and to the horizontal;

pivot means (36) linking the frame to the sled for enabling the frame to rotate from the first angular orientation to a second angular orientation about an axis generally parallel to horizontal to simulate the rolling-over of the vehicle;

force producing means for applying a force directly to one of the frame and the sled to cause the frame to rotate about the pivot means.

16. The apparatus as defined in claim 15 wherein the forcing means includes a Hyge sled (26) and piston (24), the piston movable in a first direction and capable of forcing the frame, upon impact with the sled, to move relative to the sled to place the center-of-gravity (cg) of the frame and article to be tested apart from a plane intersecting the pivot (36) thereby enabling the frame (30) to rotate.

\* \* \* \* \*